(12) United States Patent
Park et al.

(10) Patent No.: US 11,959,886 B2
(45) Date of Patent: Apr. 16, 2024

(54) SCANNER HAVING FLEXIBLE PROBE

(71) Applicants: Foundation for Research and Business, Seoul National University of Science and Technology, Seoul (KR); Korea Inspection Eng.Co., Ltd, Seoul (KR)

(72) Inventors: Ik Keun Park, Seoul (KR); Yu Min Choi, Seoul (KR); Seong Jin Lim, Seoul (KR); In Gon Jung, Gyeonggi-do (KR); Hye Jin Park, Seoul (KR)

(73) Assignees: Foundation for Research and Business, Seoul National University of Science and Technology, Seoul (KR); Korea Inspection Eng.Co., Ltd, Seoul (KR)

( * ) Notice: Subject to any disclaimer, the term of this patent is extended or adjusted under 35 U.S.C. 154(b) by 561 days.

(21) Appl. No.: 17/269,053

(22) PCT Filed: Nov. 18, 2020

(86) PCT No.: PCT/KR2020/016210
§ 371 (c)(1),
(2) Date: Feb. 17, 2021

(87) PCT Pub. No.: WO2022/102831
PCT Pub. Date: May 19, 2022

(65) Prior Publication Data
US 2022/0317093 A1 Oct. 6, 2022

(30) Foreign Application Priority Data
Nov. 13, 2020 (KR) .................. 10-2020-0151836

(51) Int. Cl.
*G01N 29/265* (2006.01)
*G01N 29/04* (2006.01)
*G01N 29/22* (2006.01)

(52) U.S. Cl.
CPC .......... *G01N 29/265* (2013.01); *G01N 29/04* (2013.01); *G01N 29/225* (2013.01);
(Continued)

(58) Field of Classification Search
CPC .... G01N 29/04; G01N 29/225; G01N 29/265; G01N 2291/0234; G01N 2291/0289; G01N 2291/2634; G01N 2291/267
See application file for complete search history.

(56) References Cited

U.S. PATENT DOCUMENTS 1,863,053 A * 6/1932 Hunter ............... C21D 9/00
432/254.2
5,969,531 A 10/1999 Murakami et al.
(Continued)

FOREIGN PATENT DOCUMENTS

| KR | 10-0266349 | 9/2000 |
|---|---|---|
| KR | 10-2014-0113209 | 9/2014 |

(Continued)

OTHER PUBLICATIONS

International Search Report dated Dec. 1, 2021 From the International Searching Authority Re. Application No. PCT/KR2020/016210. (3 Pages).

*Primary Examiner* — Justin N Olamit

(57) ABSTRACT

The present invention relates to a scanner having a flexible probe which is an apparatus capable of being utilized for an inspection on a weld zone of a general ferrite material and a stainless material and allowing an inspection to be performed on a fitting weld zone where it is difficult for a
(Continued)

general phased array ultrasonic testing (PAUT) probe to approach. A scanner having a flexible probe according to the present invention includes a probe fixing body (110) which moves while coming into contact with a surface of a bent fitting pipe and to which a probe body (101) is fixed, a flexible connecting chain part (120) installed to be connected to one end of the probe fixing body (110) and having a freely bendable structure, a sensor installation part (130) installed on an end of the flexible connecting chain part (120) and configured to move while pressed against the surface of the fitting pipe, a sensor (140) which is connected to the probe body (101) in a flexible state and of which an end is installed on the sensor installation part (130) and scans a weld zone of the fitting pipe, and an encoder part (150) installed to be connected at one side of the probe fixing body (110) and configured to move while pressed against the fitting pipe and detect a moving distance and a position.

2 Claims, 6 Drawing Sheets

(52) U.S. Cl.
CPC ............... *G01N 2291/0234* (2013.01); *G01N 2291/0289* (2013.01); *G01N 2291/2634* (2013.01); *G01N 2291/267* (2013.01)

(56) References Cited

U.S. PATENT DOCUMENTS

| | | | | |
|---|---|---|---|---|
| 8,590,383 | B2 * | 11/2013 | Brignac | ............... G01N 29/265 73/635 |
| 8,646,347 | B2 * | 2/2014 | Dubbeldam | .......... F16L 3/1066 73/866.5 |
| 2009/0145249 | A1 * | 6/2009 | Dubbeldam | ........... G01D 11/30 73/866.5 |
| 2014/0277741 | A1 | 9/2014 | Kwon et al. | |
| 2021/0364475 | A1 | 11/2021 | Lim et al. | |

FOREIGN PATENT DOCUMENTS

| | | |
|---|---|---|
| KR | 10-2016-0135613 | 11/2016 |
| KR | 10-2019-0081974 | 7/2019 |
| KR | 10-2088704 | 3/2020 |

\* cited by examiner

[FIG. 1]
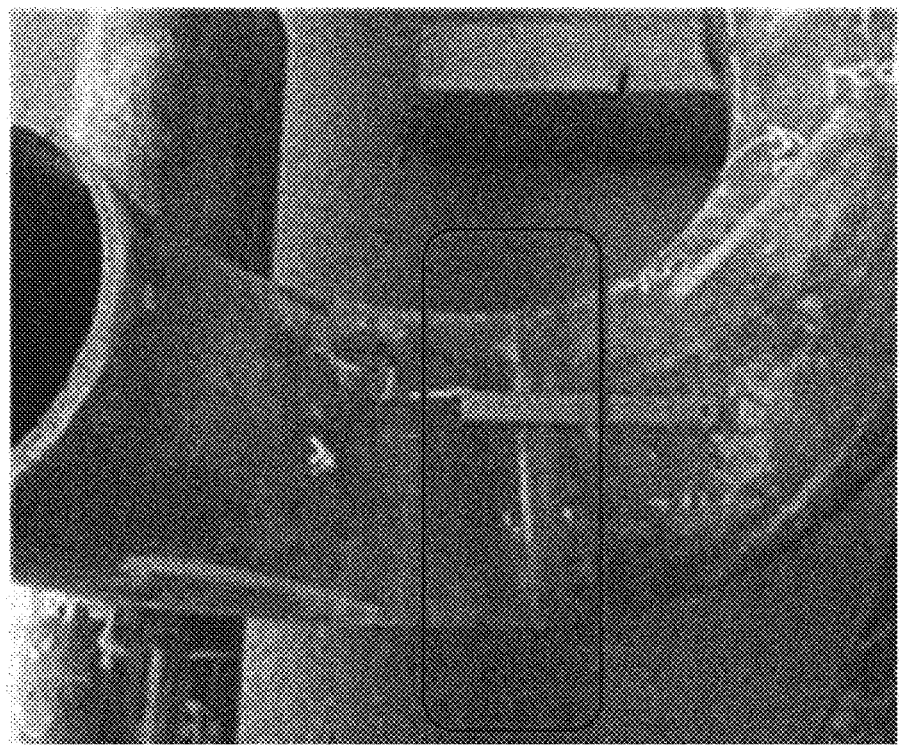

[FIG. 2]
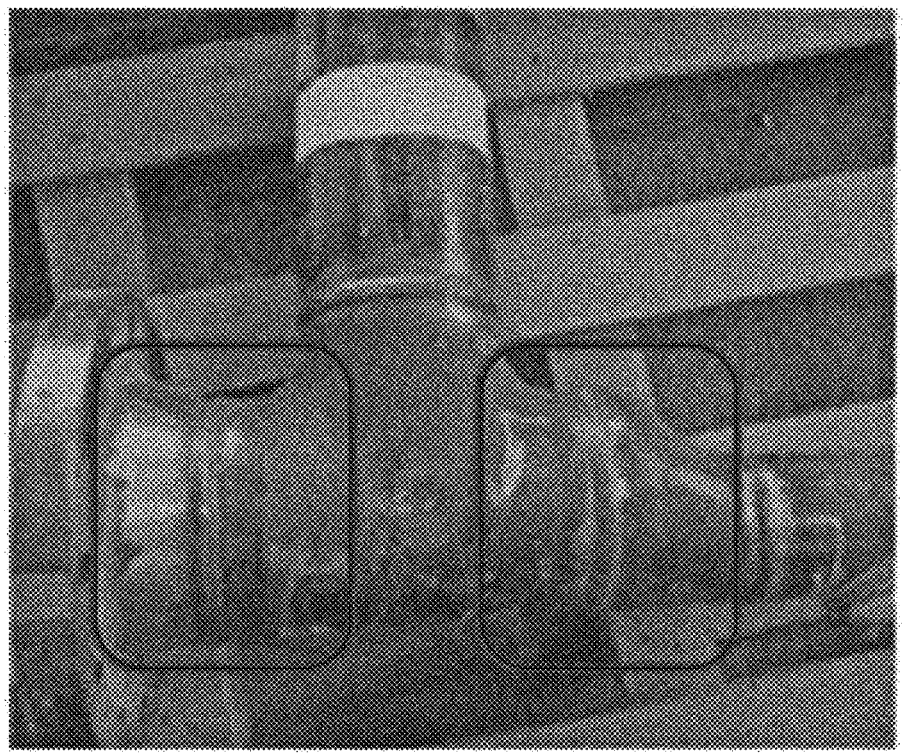

[FIG. 3]
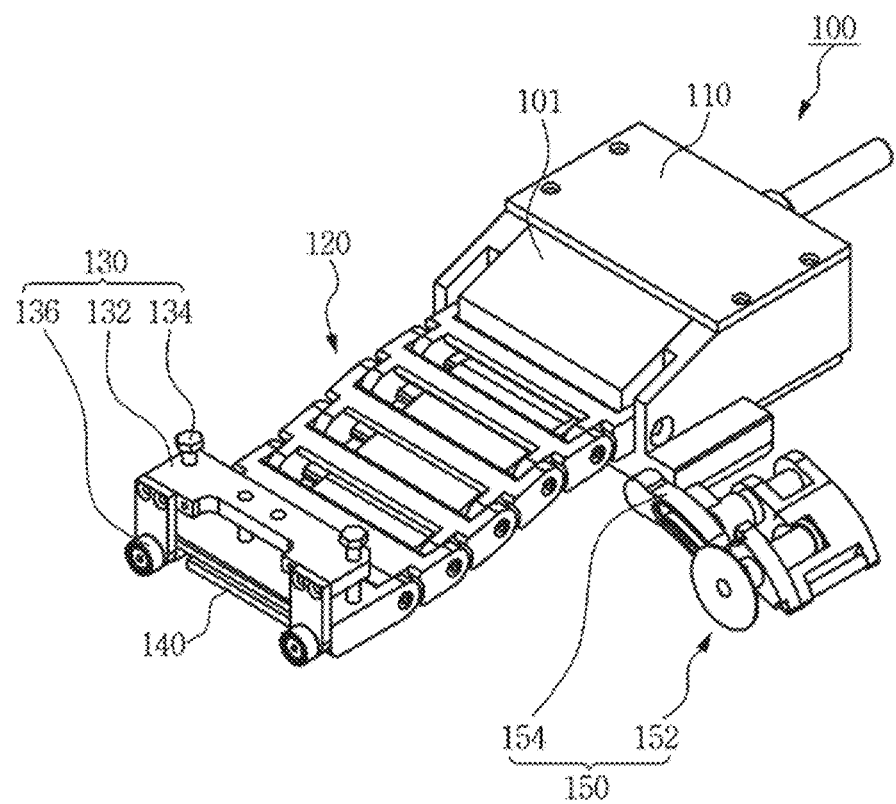

[FIG. 4]
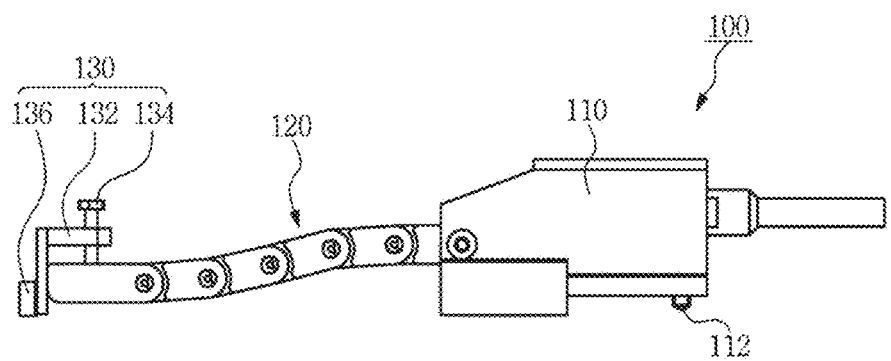
[FIG. 5]
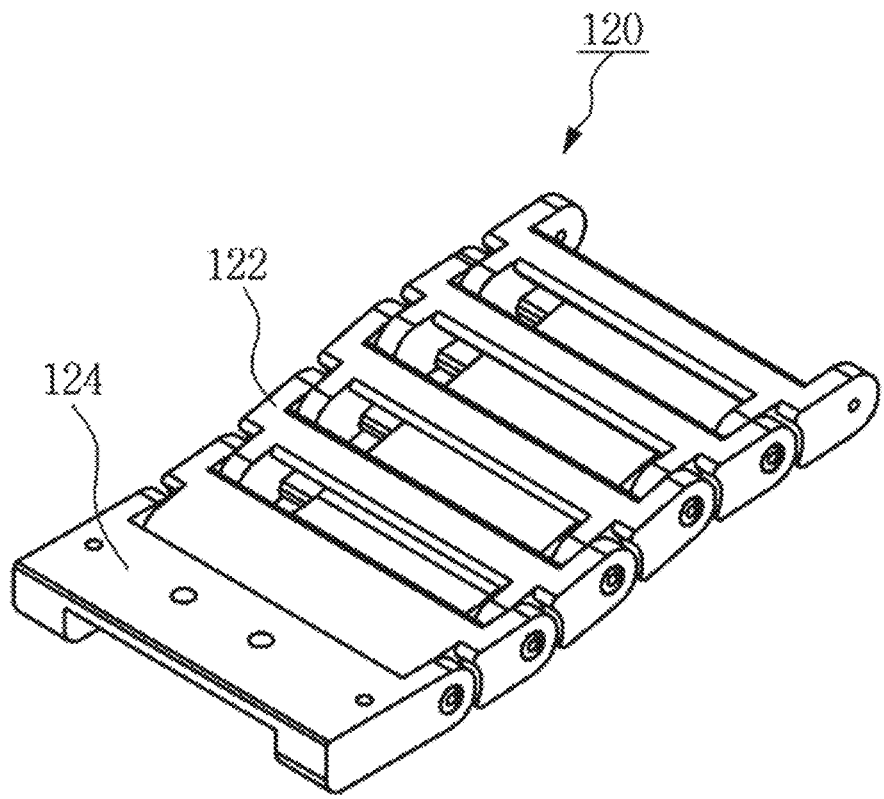

[FIG. 6]
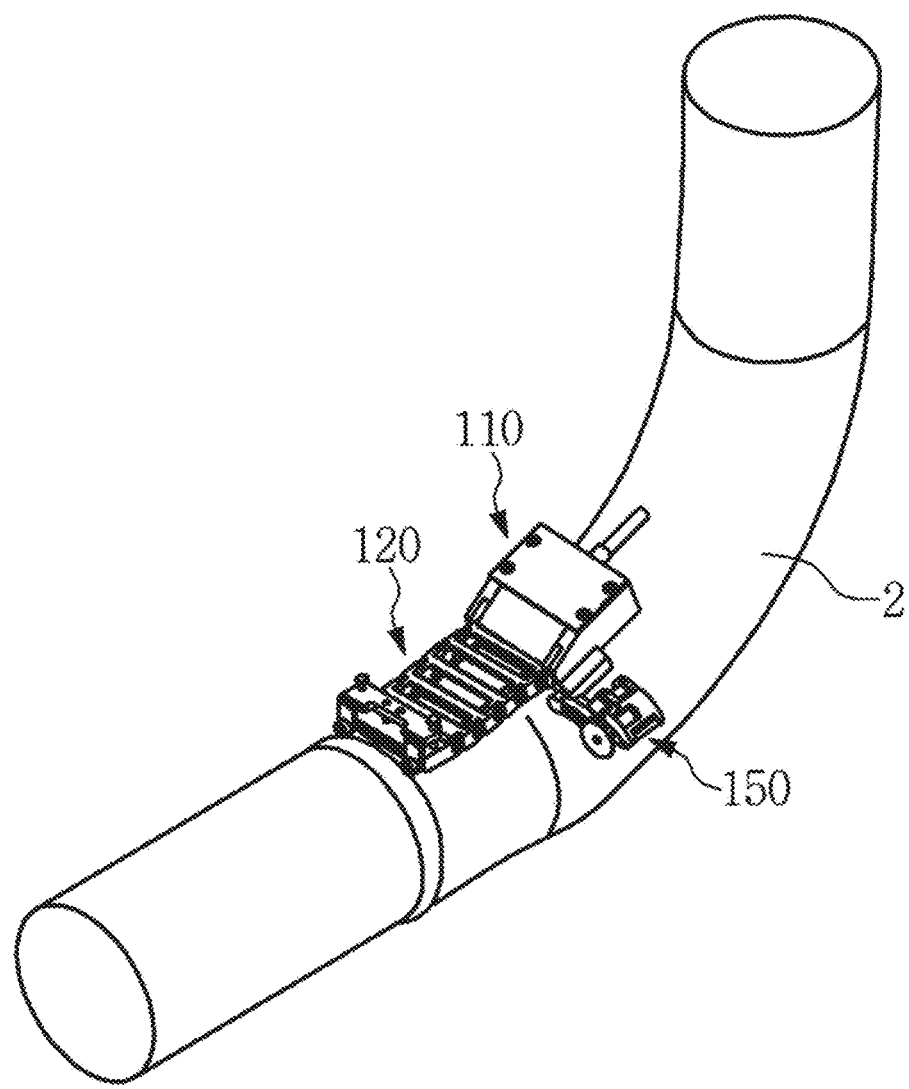

[FIG. 7]
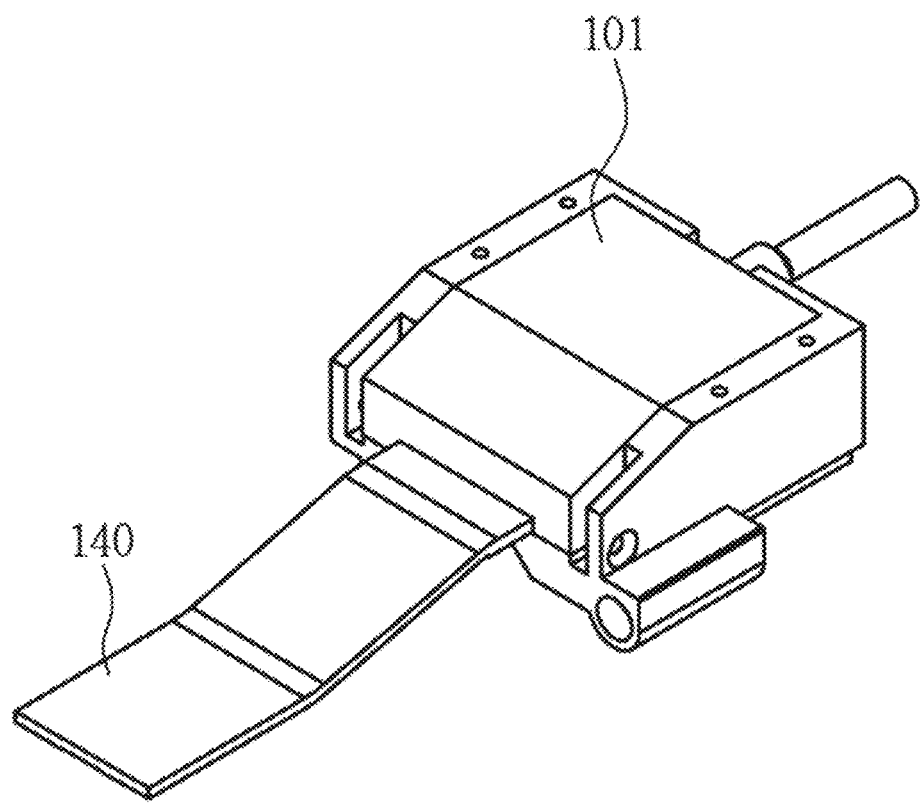

SCANNER HAVING FLEXIBLE PROBE

RELATED APPLICATIONS

This application is a National Phase of PCT Patent Application No. PCT/KR2020/016210 having International filing date of Nov. 18, 2020, which claims the benefit of priority of Korean Patent Application No. 2020-0151836 filed on Nov. 13, 2020. The contents of the above applications are all incorporated by reference as if fully set forth herein in their entirety.

FIELD AND BACKGROUND OF THE INVENTION

The present invention relates to a scanner having a flexible probe, and more specifically, to a scanner having a flexible probe which is an apparatus capable of being utilized for an inspection on a weld zone of a general ferrite material and a stainless material and allowing an inspection to be performed on a fitting weld zone where it is difficult for a general phased array ultrasonic testing (PAUT) probe to approach.

Shapes of tubes and pipes installed in power plants are formed to have various structures due to nearby apparatuses and usage environments. Nondestructive inspections cannot be applied to branch pipes among various shapes of weld zones formed on the tubes and pipes due to spatial and environmental causes allowed in the nondestructive inspections. Accordingly, there is a limit on inspection from a viewpoint of checking material integrity.

In addition, objective and reliable data can be obtained only when inspection data is obtained through an automatic or semi-automated scanning method, not through a manual manner. In the case of fitting pipes (for example, elbows, T-pipes, and reducers), since it is difficult for probes to come into contact with the fitting pipes due to structural shapes of inner and outer surfaces as illustrated in FIGS. 1 and 2, it is difficult to obtain reliable and reproducible signals.

Accordingly, development of a scanner suitable for the fitting pipes is acutely required so that the nondestructive inspections are performed on the weld zones formed on the fitting pipes so as to ideally obtain phased array ultrasonic testing (PAUT) signals.

SUMMARY OF THE INVENTION

The present invention is directed to providing a scanner having a flexible probe which is installed on an inner or outer surface of a fitting pipe where it is difficult for a phased array ultrasonic testing (PAUT) to approach and allows an entire weld zone to be volume-inspected in a thickness direction.

According to an aspect of the present invention, there is provided a scanner having a flexible probe, including a probe fixing body (110) which moves while coming into contact with a surface of a bent fitting pipe and to which a probe body (101) is fixed, a flexible connecting chain part (120) installed to be connected to one end of the probe fixing body (110) and having a freely bendable structure, a sensor installation part (130) installed on an end of the flexible connecting chain part (120) and configured to move while pressed against the surface of the fitting pipe, a sensor (140) which is connected to the probe body (101) in a flexible state and of which an end is installed on the sensor installation part (130) and scans a weld zone of the fitting pipe, and an encoder part (150) installed to be connected at one side of the probe fixing body (110) and configured to move while pressed against the fitting pipe and detect a moving distance and a position.

The probe fixing body may include ball plungers provided at four positions of a lower surface of the probe fixing body and configured to slidably move the probe fixing body along the surface of the fitting pipe.

The flexible connecting chain part (120) may include a chain (122), which is adjustable in length due to having a structure formed with a plurality of joints, and a sensor seating plate (124) which is installed to be connected to an end of the chain and on which the end of the sensor is seated.

The sensor installation part (130) may include a press-applying part coupled to the sensor seating plate and configured to apply a uniform pressure to the end of the sensor, an elastic coupling part that elastically couples the press-applying part to the sensor seating plate, and a wheel installed to be coupled to a side portion of the press-applying part and configured to move the press-applying part by rotating in a state in which the wheel is pressed against the surface of the fitting pipe by a magnetic force.

The encoder part may include an encoder coupled to the probe fixing body and configured to detect the moving distance and the position while moving along the surface of the fitting pipe, and an encoder coupling part that couples the encoder to the probe fixing body so that an angle between the encoder and the probe fixing body is adjustable.

BRIEF DESCRIPTION OF THE SEVERAL VIEWS OF THE DRAWINGS

The above and other objects, features and advantages of the present invention will become more apparent to those of ordinary skill in the art by describing exemplary embodiments thereof in detail with reference to the accompanying drawings, in which:

FIGS. 1 and 2 are images showing general examples of fitting pipes;

FIG. 3 is a perspective view illustrating a structure of a scanner having a flexible probe according to one embodiment of the present invention;

FIG. 4 is a side view illustrating the structure of the scanner having the flexible probe according to one embodiment of the present invention;

FIG. 5 is a perspective view illustrating a structure of a flexible connecting chain part according to one embodiment of the present invention;

FIG. 6 is a view illustrating a state in which the scanner having the flexible probe is applied to one of fitting pipes according to one embodiment of the present invention; and FIG. 7 is a perspective view illustrating a structure of the flexible probe according to one embodiment of the present invention.

DESCRIPTION OF SPECIFIC EMBODIMENTS OF THE INVENTION

Hereinafter a specific embodiment of the present invention will be described in detail with reference the accompanying drawings.

As illustrated in FIGS. 3 and 4, a scanner 100 having a flexible probe includes a probe fixing body 110, a flexible connecting chain part 120, a sensor installation part 130, a sensor 140, and an encoder part 150.

First, as illustrated in FIG. 3, the probe fixing body 110 is a component which provides a space in which a probe body 101 is fixed. In addition, the flexible connecting chain part 120 is coupled to a front surface of the probe fixing body 110, and the encoder part 150 is coupled to a side surface thereof. In the present embodiment, as illustrated in FIG. 7, the probe body 101 fixed to the probe fixing body 110 has a structure in which the sensor 140 protrudes in a forward direction, and the sensor 140 is formed of a flexible material.

In addition, as illustrated in FIG. 6, the probe fixing body 110 moves while coming into contact with a surface of a fitting pipe 2 which is bent in a state in which the probe body 101 is fixed. Accordingly, as illustrated in FIG. 4, ball plungers 112 are provided on the probe fixing body 110. Specifically, the ball plungers 112 are provided at four positions of a lower surface of the probe fixing body 110 and are components which allow the probe fixing body 110 to slidably move along the surface of the fitting pipe 2.

Next, as illustrated in FIGS. 3 and 4, the flexible connecting chain part 120 is a component installed to be connected to one end of the probe fixing body 110 and having a freely bendable structure. The sensor 140 of the probe body 101 is embedded in the flexible connecting chain part 120 and moves therewith. Accordingly, the flexible connecting chain part 120 and the sensor 140 have an advantage of being able to correspond to the surface of the fitting pipe 2 having one of various shapes.

To this end, in the present embodiment, the flexible connecting chain part 120 may include a chain 122 and a sensor seating plate 124 as specifically illustrated in FIG. 5. First, as illustrated in FIG. 5, the chain 122 is a component that is adjustable in length due to having a structure formed with a plurality of joints which provide a flexible property to the flexible connecting chain part 120 according to the present invention.

Next, as illustrated in FIGS. 3 and 5, the sensor seating plate 124 is a component installed to be connected to an end of the chain 122, and an end of the sensor 140 is seated on a lower surface thereof.

Next, as illustrated in FIGS. 3 and 4, the sensor installation part 130 is a component installed on an end of the flexible connecting chain part 120 and moved while being pressed against the surface of the fitting pipe 2. In addition, the sensor installation part 130 elastically presses the end of the sensor 140 seated on the sensor seating plate 124 so that the end of the sensor 140 approaches the fitting pipe 2 as close as possible.

To this end, in the present embodiment, the sensor installation part 130 may include a press-applying part 132, elastic coupling parts 134, and wheels 136 as specifically illustrated in FIG. 3. First, the press-applying part 132 is a component coupled to the sensor seating plate 124 and configured to apply a uniform pressure to the end of the sensor 140. In addition, as illustrated in FIGS. 3 and 4, the elastic coupling part 134 is a component that elastically couples the press-applying part 132 to the sensor seating plate 124.

In addition, the wheel 136 is a component installed to be coupled to a side portion of the press-applying part 132 and configured to move the press-applying part 132 by rotating in a state in which the wheel 136 is pressed against the surface of the fitting pipe 2 by a magnetic force.

Next, as illustrated in FIG. 7, the sensor 140 is a component connected to the probe body 101 in a flexible state, and the end thereof is installed on the sensor installation part 130 to scan a weld zone of the fitting pipe.

Next, as illustrated in FIG. 3, the encoder part 150 is a component installed to be connected to one side of the probe fixing body 110 and configured to move in a state in which the encoder part 150 is pressed against the fitting pipe 2 and detect a moving distance and a position as illustrated in FIG. 6. In this case, since the encoder part 150 should detect the moving distance and the position while moving along the curved surface of the fitting pipe 2, an installation angle of the encoder part 150 should be changeable to match with a curvature of the fitting pipe 2.

Accordingly, in the present embodiment, the encoder part 150 includes an encoder 152 and an encoder coupling part 154 as specifically illustrated in FIG. 3. In this case, the encoder 152 is a component coupled to the probe fixing body 110 and configured to detect the moving distance and the position while moving along the surface of the fitting pipe 2. In addition, the encoder coupling part 154 is a component coupling the encoder 152 to the probe fixing body 110 so that an angle between the encoder 152 and the probe fixing body 110 is adjustable. Accordingly, the encoder coupling part 154 has a structure allowing the installation angle of the encoder 152 to be changeable to match with the curvature of the fitting pipe 2.

According to a scanner having a flexible probe, there is an advantage that an apparatus can be utilized for an inspection on a weld zone of a general ferrite material and a stainless material and can perform an inspection on a fitting weld zone where it is difficult for a general phased array ultrasonic testing (PAUT) probe to approach.

That is, there is an advantage in that data can be obtained in real time and analyzed at a weld zone formed on fitting pipes having a curvature through a flexible probe, to which a phased array ultrasonic testing (PAUT) method is applied, without using a wedge necessarily used for a conventional inspection.

What is claimed is:
1. A scanner having a flexible probe, comprising:
a probe fixing body which moves while coming into contact with a surface of a bent fitting pipe and to which a probe body is fixed;
a flexible connecting chain part installed to be connected to one end of the probe fixing body and having a freely bendable structure;
a sensor installation part installed on an end of the flexible connecting chain part and configured to move while pressed against the surface of the fitting pipe;
a sensor flexibly connected to the probe fixing body, an end of the sensor is installed on the sensor installation part to scan a weld zone of the fitting pipe; and
an encoder part installed to be connected at one side of the probe fixing body and configured to move while pressed against the fitting pipe and detect a moving distance and a position,
wherein the probe fixing body includes ball plungers provided at four positions of a lower surface of the probe fixing body and configured to slidably move the probe fixing body along the surface of the fitting pipe,
wherein the flexible connecting chain part includes:
a chain that is adjustable in length due to having a structure formed with a plurality of joints; and
a sensor seating plate which is installed to be connected to an end of the chain and on which the end of the sensor is seated,
wherein the sensor installation part includes:
a press-applying part coupled to the sensor seating plate and configured to apply a uniform pressure to the end of the sensor;
an elastic coupling part that elastically couples the press-applying part to the sensor seating plate; and
a wheel installed to be coupled to a side portion of the press-applying part and configured to move the press- applying part by rotating in a state in which the wheel is pressed against the surface of the fitting pipe by a magnetic force, wherein a rotation axis of the wheel is arranged perpendicular to a radius of curvature of the chain.

2. The scanner of claim 1, wherein the encoder part includes:

an encoder coupled to the probe fixing body and configured to detect the moving distance and the position while moving along the surface of the fitting pipe; and an encoder coupling part that couples the encoder to the probe fixing body so that an angle between the encoder and the probe fixing body is adjustable.

* * * * *